April 21, 1925.  
C. KOHLER  
1,534,453  
WATER COOLER FOR LOCOMOTIVES  
Filed Dec. 13, 1921

Inventor  
Conrad Kohler  
by Henry Orth Jr  
Atty

Patented Apr. 21, 1925.

1,534,453

UNITED STATES PATENT OFFICE.

CONRAD KOHLER, OF ZURICH, SWITZERLAND.

WATER COOLER FOR LOCOMOTIVES.

Application filed December 13, 1921. Serial No. 522,106.

*To all whom it may concern:*

Be it known that I, CONRAD KOHLER, a citizen of the Republic of Switzerland, residing at Zurich, Switzerland, have invented certain new and useful Improvements in Water Coolers for Locomotives, of which the following is a specification, reference being had therein to the accompanying drawing.

The invention relates to improvements in a cross-current recooling installation for recooling the cooling water of steam condensing plants on vehicles.

Cross-current recooling installations are already known which satisfactorily permits an effective recooling of the cooling water of steam condensing plants on vehicles at determined outputs and at determined running speeds of the vehicle. However these arrangements fail to give satisfactory results when they have to cool the cooling water for condensers of steam power engines having an output that is double of that of the engines which are ordinarily used or when the speed of the train is considerably smaller than the normal running speed. In the first case, i. e. when the output of the steam-power engine is very great the quantity of the cooling water to be recooled is so great that it cannot be cooled down to the required degree in the comparatively small space available for recooling purposes on the recooling device. An increase of the recooling effect could be attained theoretically by increasing the cross-sectional area through which the cooling air flows; the railway clearance gauge, however, limits an increase in that direction. On the other hand said increase in the cooling effect could be attained by lengthening the air channel. A too great lengthening of this channel is however useless as the air cannot absorb any further heat from the cooling water after having been saturated, so that near the exit end of a too long channel the already saturated air would not have any cooling action on the water to be recooled. If the running speed is low, the quantity of air coming into contact with cooling water falling through the air channel of the recooling device in a rain-like distribution is insufficient for effecting a recooling of the cooling water by the necessary degree.

The object of the present invention is to provide a cross-current recooling installation for steam engines operating with condensation on vehicles which makes possible the recooling of the cooling water to the required degree even in the case in which the output of the steam engine is continuously very great as well as in the case in which the running speed of the vehicle is continuously low at the normal output of the steam engine.

To this end the cross-current recooling installation is, according to the invention subdivided into a number of cross-current recoolers, each of which is traversed by a separate air current upon the running of the vehicle. The water to be recooled may preferably be led to the single cross-current recoolers in parallel connection. With such an installation large quantities of heat may be absorbed as the air-currents which are independent of each other and flow through the several cross-current recoolers have only to travel over comparatively short distances and therefore the danger does not exist that already before they have reached the exit end of the air-channels said air-currents are saturated and are no longer effective for recooling the cooling water.

The cross-current recoolers may each be mounted upon a separate vehicle or they may be arranged on a common vehicle. The construction of the single cross-current recoolers mounted on separate vehicles enables a better admission of the air to the cooling channel of the recooler, so that this construction is preferred to that in which the various recoolers are arranged on the same cooling vehicle. When there are several coolers arranged one after the other, each cooler except the first one may be made to take in air at least partially from below. The exit of the cooling air may be arranged at the upper part of the vehicle so that the cooling air leaving the front vehicle cannot be drawn into the cooling channel of the following vehicle.

Several constructional examples of the installation according to the invention are illustrated in the accompanying drawings, in which.

Figure 1:
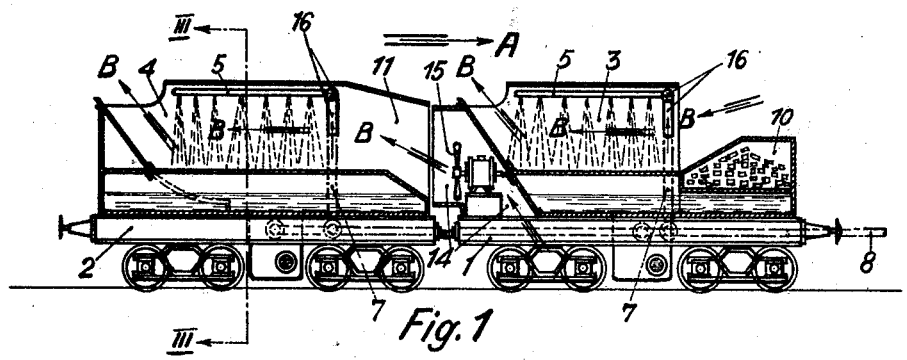
Fig. 1 is a vertical longitudinal section through a cross-current recooling installation having two cross-current recoolers each arranged upon a separate vehicle.
Figure 2:
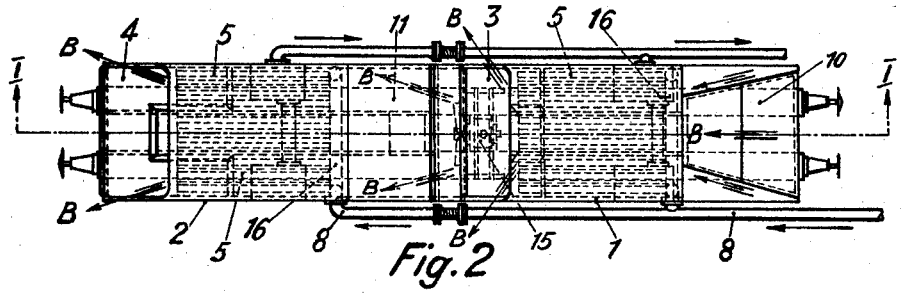
Fig. 2 is a plan view of the installation shown in Fig. 1 and Fig. 3 a section along line III—III of Fig. 1.
Figure 3:
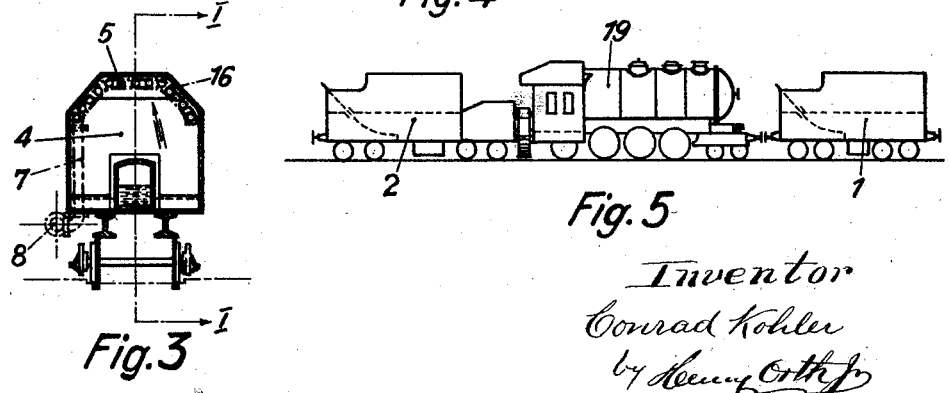

In the installation illustrated in Figs. 1 to 3, 1 and 2 denote two cross-current recoolers each of which is mounted upon a separate vehicle and provided with air channels 3 and 4 respectively extending substantially in the direction of running indicated by the arrow A. The distributor for the cooling water to be recooled comprises a number of perforated pipes 5 and a channel 16 having in its vertical section, transverse to the direction of traveling, the shape of a vaulted door. The channels 16 are connected to pipes 7 which in their turn are connected to a conduit 8 supplying the water to be recooled. In this way the cooling water to be recooled flows to the coolers 1 and 2 in parallel connection. 10 denotes a coal bunker and 11 an air channel extending in front of the air channel 4. In the rear part of the cooler 1 an air channel 14 is provided which communicates with the atmosphere at its lower end and which extends toward the rear with respect to the direction of running, where it opens into the air channel 11; the air channel 14 tapering down towards the rear. Inside the channel 14 a fan 15 is provided which forcibly supplies the air channels 11, 4 with a portion of the cooling air drawn from below whilst the other portion of the air enters the channel 11 from the sides. The exit of the cooling air flowing through the coolers in the direction of the arrows B occurs at the upper part of the coolers so that the discharged air of the front cooler is not drawn into the cooling channel of the following cooler. In consequence of the subdivision of the installation into a number of cross-current coolers each of which is traversed by its own air-current when the locomotive is running, it is possible in such an installation to cool comparatively large quantities of water to a determined degree and that even at comparatively small running speeds.

Figure 5:
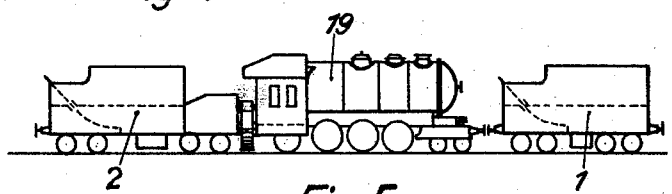

Obviously the installation may comprise more than two coolers each mounted upon a separate vehicle. Instead of arranging such coolers one behind the other in the manner shown, the coolers 1 and 2 may be arranged in front of and at the rear of the locomotive 19 respectively as illustrated in Fig. 5.

The distance between two coolers may, if desired, be chosen so that in the rear cooler a natural draft is induced by the motion of the locomotive that is sufficient to cause a sufficiently large quantity of air to pass through the air channel of the rear cooler without using mechanical means for supplying air.

Instead of the fan 15 any other mechanical means for supplying air may be utilized.

Figure 4:
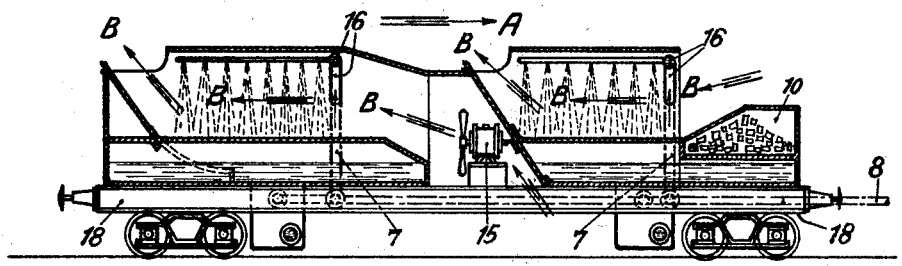
Fig. 4 illustrates a vertical longitudinal section of two cross-current recoolers mounted upon a single vehicle and Fig. 5 is a side view on a smaller scale of an installation with one cooler in front and one in the rear of the locomotive.

Further it may be pointed out that the water to be recooled may be supplied to the single cross-current recoolers of the installation in any other manner differing from that shown without altering the scope of the present invention. Finally attention may be called to the fact that the various cross-current rain-coolers forming the installation may each be mounted upon a single vehicle (18) in the manner shown in Fig. 4.

I claim:

1. In a water cooling installation for condensing plants of stream driven vehicles, a plurality of successive air channels disposed longitudinally, means to supply water to be cooled by evaporation to each of said channels, deflecting means at the discharge end one of the channels to deflect moisture laden air past the entrance to the next succeeding channel and to direct air for evaporation into the entrance to said next succeeding channel.

2. In a water cooling installation for condensing plants of steam driven vehicles, a plurality of successive air channels disposed longitudinally, means to supply water to be cooled by evaporation to each of said channels, a deflecting wall at the discharge end of one of the channels, said wall being arranged to deflect moisture laden air on one surface thereof past the entrance to the next succeeding channel and on its opposite surface to direct air for evaporation into the entrance to the next succeeding channel.

In testimony whereof I affix my signature.

CONRAD KOHLER.